United States Patent
Zhao et al.

(10) Patent No.: US 7,636,796 B2
(45) Date of Patent: Dec. 22, 2009

(54) SMART INTERCONNECT FOR MODULAR MULTI-COMPONENT EMBEDDED DEVICES

(75) Inventors: Feng Zhao, Issaquah, WA (US);
Nissanka B. Priyantha, Redmond, WA (US); Dimitrios Lymperopoulos, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 315 days.

(21) Appl. No.: 11/676,097

(22) Filed: Feb. 16, 2007

(65) Prior Publication Data

US 2008/0071934 A1 Mar. 20, 2008

Related U.S. Application Data

(60) Provisional application No. 60/825,820, filed on Sep. 15, 2006.

(51) Int. Cl.
*G06F 3/00* (2006.01)
*H01R 12/16* (2006.01)

(52) U.S. Cl. .............................. 710/8; 710/62; 710/72; 710/104; 361/790

(58) Field of Classification Search .................. 710/8, 710/62, 72, 104; 361/790
See application file for complete search history.

(56) References Cited

U.S. PATENT DOCUMENTS

| | | | |
|---|---|---|---|
| 4,604,689 A | 8/1986 | Burger | 710/300 |
| 4,733,461 A | 3/1988 | Nakano | 29/830 |
| 5,201,038 A | 4/1993 | Fielder | 710/100 |
| 5,583,749 A * | 12/1996 | Tredennick et al. | 361/790 |
| 5,698,895 A * | 12/1997 | Pedersen et al. | 257/665 |
| 5,794,014 A | 8/1998 | Shetty et al. | 703/25 |
| 6,253,268 B1 | 6/2001 | Bjorkengren et al. | 710/105 |
| 6,326,806 B1 * | 12/2001 | Fallside et al. | 326/38 |
| 6,510,484 B1 | 1/2003 | Kim et al. | 710/314 |
| 6,931,468 B2 | 8/2005 | Smith et al. | 710/104 |
| 7,376,760 B1 * | 5/2008 | Ivchenko et al. | 710/8 |
| 2002/0186245 A1* | 12/2002 | Chandhoke et al. | 345/764 |
| 2003/0020512 A1* | 1/2003 | Mantey et al. | 326/38 |
| 2003/0023793 A1* | 1/2003 | Mantey et al. | 710/100 |
| 2003/0040881 A1* | 2/2003 | Steger et al. | 702/123 |
| 2004/0098569 A1* | 5/2004 | Smith et al. | 712/229 |
| 2004/0212634 A1* | 10/2004 | Hayhow | 345/700 |

(Continued)

FOREIGN PATENT DOCUMENTS

EP 651343 A1 * 5/1995

OTHER PUBLICATIONS

'AnyBoard: An FPGA-Based Reconfigurable System' by Van Den Bout et al., IEEE, 1992.*

(Continued)

*Primary Examiner*—Henry W. H. Tsai
*Assistant Examiner*—Steven G Snyder
(74) *Attorney, Agent, or Firm*—Lee & Hayes, PLLC

(57) ABSTRACT

A smart interconnect for modular multi-component embedded devices is described. In an embodiment of a smart interconnect for modular multi-component embedded devices, a desired functionality of a stack of hardware boards is accessed. For example, a user may select a new functionality for the stack of hardware boards. The desired functionality is then transmitted to a board in the stack of hardware boards and the board is configured to implement the desired functionality of the stack of hardware boards.

13 Claims, 5 Drawing Sheets

U.S. PATENT DOCUMENTS

2005/0028127 A1* 2/2005 Mauersberger .............. 716/18
2006/0023384 A1* 2/2006 Mukherjee et al. .......... 361/103

OTHER PUBLICATIONS

Bolotin, "Space-Cube: A Flexible Computer Architecture Based On Stacked Modules", retrieved at <<http://ieeexplore.ieee.org/iel3/3598/10713/00510763.pdf?isnumber=&arnumber=510763>>, Jet Propulsion Laboratory, California Institute of Technology, Pasadena, CA, pp. 20-25.

"iPack Stackable Board Format", retrieved on Aug. 17, 2006, at <<http://www.mcc-us.com/ipack1.htm>>, Micro Computer Control Corporation, Hopewell, New Jersey, USA, pp. 1-2.

Kalinsky, et al., "Introduction to I2C", retrieved on Aug. 17, 2006, at <<http://www.embedded.com/showArticle.jhtml?articleID=9900244>>, Embedded Systems Design, Jul. 31, 2001, pp. 1-5.

Webb, "Board Shuffle: Chasing Technology" retrieved on Aug. 17, 2006, at <<http://www.edn.com/article/CA480470.html>>, EDN, Nov. 25, 2004, pp. 1-7.

* cited by examiner

SMART INTERCONNECT FOR MODULAR MULTI-COMPONENT EMBEDDED DEVICES

RELATED PATENT APPLICATIONS

This U.S. patent application claims the benefit of priority from, and hereby incorporates by reference the entire disclosure of, co-pending U.S. Provisional Application for Letters Patent Ser. No. 60/825,820 filed Sep. 15, 2006, and titled "Smart Interconnect for Modular Multi-Component Embedded Devices".

BACKGROUND

Currently, stack based architectures are used to perform a multitude of functions. A stackable multi-board architecture includes a collection of individually designed hardware boards, such as printed circuit boards, on which a variety of electrical components can be arranged in an electrical circuit. Each hardware board in a stack of boards is capable of performing one or more discrete tasks and the plurality of hardware boards in the stack of boards are electrically coupled to one another using buses. Once the hardware boards are coupled together, the resulting stack of boards is capable of performing one or more functions based on the discrete tasks of the individual hardware boards.

For example, a compact modular wireless sensor platform can be formed by coupling together a sensor board, a processor board, a wireless communication board, and a power regulation board.

SUMMARY

This summary is provided to introduce simplified concepts relating to a smart interconnect for modular multi-component embedded devices which are further described below in the detailed description. This summary is not intended to identify essential features of the claimed subject matter, nor is it intended for use in determining the scope of the claimed subject matter.

In an embodiment of a smart interconnect for modular multi-component embedded devices, a desired functionality of a stack of hardware boards is accessed. For example, a user may select a desired functionality for the stack of hardware boards. The desired functionality is then transmitted to a board in the stack of hardware boards and the stack of boards is configured to implement the desired functionality of the stack of hardware boards.

BRIEF DESCRIPTION OF THE DRAWINGS

The detailed description is described with reference to the accompanying figures. In the figures, the left most digit(s) of a reference number identifies the figure in which the reference number first appears. The same numbers are used throughout the drawings to reference like features and components.

DETAILED DESCRIPTION

A smart interconnect for modular multi-component embedded devices is described in which embodiments provide for altering of a functionality of a stack of hardware boards by altering a functionality of one or more hardware boards in the stack of hardware boards. In one embodiment, the altering of the functionality of the one or more hardware boards is achieved by reprogramming at least one computing element on the one or more hardware boards.

While aspects of described systems and methods for a smart interconnect for modular multi-component embedded devices can be implemented in any number of different environments, and/or configurations, embodiments of a smart interconnect for modular multi-component embedded devices are described in the context of the following exemplary system architecture(s).

An Exemplary System

Figure 1:
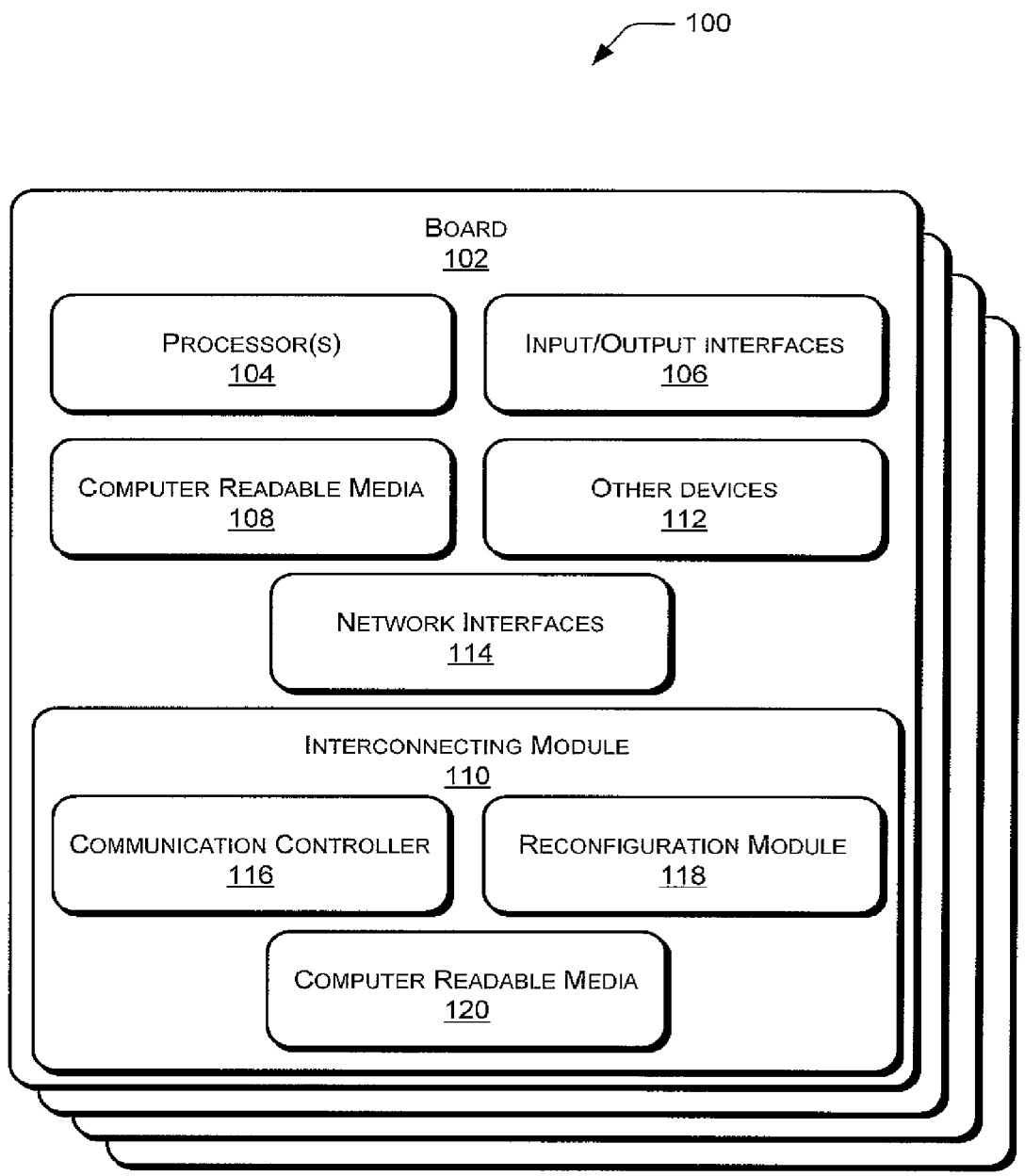
FIG. 1 illustrates an exemplary stack of hardware boards for modular multi-component embedded devices including a plurality of individual electronic boards or hardware boards.

FIG. 1 illustrates an exemplary stack of hardware boards 100 including a plurality of individual hardware boards 102 coupled to each other using one or more buses. The buses may include, for example, a universal serial bus (USB), a recommended standard-232 (RS-232), a serial peripheral interface (SPI), an inter-integrated circuit bus (I2C), a parallel bus, or a combination of these buses. Hardware boards 102 can include printed circuit boards on which various components such as integrated circuits (ICs), capacitors, inductors, computing-based devices, and switches may be coupled to one another in one or more circuits. Hardware boards 102 may also be configured to perform one or more functions. For example, hardware boards 102 can include power boards, radio boards, video boards, humidity sensor boards, temperature sensor boards, general purpose processor boards, special purpose processor boards, input/output (IO) boards, sensor/actuator boards, bluetooth radio boards, global system for mobile communications (GSM) radio boards, radio boards, or any combination thereof.

By coupling together hardware boards 102, modular multi-component embedded devices can be formed. Modular multi-component embedded devices are devices including several discrete functional components, such as assorted hardware boards 102 having individual functionalities, or assorted stacks of hardware boards 100, having various functionalities. Modular multi-component embedded devices can be found in various devices, including automatic teller machines, home automation systems, engine controllers and automatic brake controllers for automobiles, integrated systems in aircraft and missiles, handheld devices, and security monitoring systems. The formation and uses of modular multi-component embedded devices will be discussed in more detail in conjunction with FIGS. 2-5 below.

Each hardware board 102 in stack of hardware boards 100 can include one or more processor(s) 104, one or more input/output interfaces 106, computer readable media 108, an interconnecting module 110, other devices 112, and network interfaces 114. Processor(s) 104 can access and/or execute computer program instructions stored inside processor(s) 104 or on computer readable media 108. Processor(s) 104 may include a microprocessor, microcomputer, microcontroller, etc. Hardware board 102 receives data related to its functionality through input/output interfaces 106. Input/output interfaces 106 may include, for example serial buses (such as RS232, etc.), and parallel ports (such as input/output ports of a processor). Input/output interfaces 106 can send and receive data from one or more external sources.

Examples of external sources can include a video camera, a microphone, a temperature sensor, a humidity sensor, a light sensor, a smoke sensor, a power supply, a cell phone, a radio, a relay, a motor, an actuator, and so on.

Additionally, input/output interfaces 106 can send and receive data to and from data sources residing on board 102, such as in other devices 112. Such data sources can include a video camera, a microphone, a temperature sensor, a humidity sensor, a light sensor, a smoke sensor, a power supply, a cell phone, a radio, a relay, a motor, an actuator, and so on. For example, hardware board 102 can include a wireless transceiver in other devices 112, and signals can be sent from hardware board 102 and received by hardware board 102 through the transceiver.

In one exemplary implementation, stack of hardware boards 100 may reside in a computing-based device and the computing-based device may receive data from one or more computing-based devices over a network through network interfaces 114. For example, one or more hardware boards 102 of stack of hardware boards 100 in a computing-based device may receive data related to any problem or fault that has occurred in one or more computing-based devices over a network at network interfaces 114. The network may include a local area network (LAN), a wide area network (WAN), or any combination thereof.

In another implementation, the one or more computing-based devices may be connected to external devices, for example, a video camera, a microphone, a temperature sensor, a humidity sensor, a light sensor, a smoke sensor, and a fire sensor, etc.

Interconnecting module 110 can include a communication controller 116, a reconfiguration module 118, and computer readable media 120. Communication controller 116 controls a flow of data between hardware boards 102 in stack of hardware boards 100. Communication controller 116 may include, for example, a multiplexer/demultiplexer, a programmable logic device, etc. Communication controllers 116 residing on each hardware board 102 of stack of hardware boards 100 are connected to each other using one or more buses performing various functions.

By coupling a multitude of hardware boards 102 together in stack of boards 100, it is possible to have stack of boards 100 perform several functions. For example, stack of boards 100 may include a thermometer hardware board 102 configured to measure temperature, as well as a humidity sensing hardware board 102 to measure humidity. In this way, stack of boards 100 can be configured in a first configuration to utilize data collected by the thermometer hardware board 102 and measure temperature. Alternately, stack of hardware boards 102 can be reconfigured into a second configuration to utilize data collected by the humidity sensing board 102 and thus measure humidity.

To reconfigure stack of hardware boards 100 and implement a new functionality (i.e. a function to be performed by stack of hardware boards 100), data and commands relating to the new functionality can be received by one or more hardware board(s) 102 prompting hardware board(s) 102 to undergo a reconfiguration process to implement the new functionality. In one exemplary implementation, the data and commands flowing between hardware boards 102 of stack of hardware boards 100 can be synchronized using a time stamp for tracking a timing of the data.

In one embodiment, stack of hardware boards 100 can include a master board 102 configured to receive data and commands indicative of a new functionality for stack of hardware boards 100. The new functionality can be received from an external source through input/output interfaces 106 at master board 102. For example, a user may transmit the new functionality to input/output interfaces 106 requesting, for example, that stack of hardware boards 100 switch from measuring a temperature to measuring a humidity. Returning to our example from above, such a reconfiguration would entail altering stack of hardware boards 100 to begin receiving information from a humidity sensing board 102 in stack of hardware boards 100 rather than receiving temperature data from a thermometer board 102 in stack of hardware boards 100.

The new functionality can also be transmitted to input/output interfaces 106 from an external device coupled to input/output interfaces 106. For example, the new functionality can be transmitted from a radio board coupled to a hardware board 102 through input/output interfaces 106 on the hardware board 102. In this way, hardware board 102 can be controlled by remote users and/or other computing-based devices.

Alternately, the new functionality can be received from other devices 112 residing on board 102. For example, an audio receiver in other devices 112 may begin receiving audio signals. In another exemplary embodiment, a temperature sensor in other devices 112 may measure a change in temperature. In another exemplary embodiment, the new functionality can be received from one or more storage media coupled to elements of any of boards 102 of stack of hardware boards 100.

Once received at master board 102, whether via input/output interfaces 106, or other devices 112, data and commands in the new functionality can trigger processor(s) 104 to send signals to interconnecting module 110 on master board 102 instructing interconnecting module 110 to identify the new functionality. For example, data and commands associated with a new functionality, such as determining a temperature in a particular enclosure, is sent by a remote user/administrator to a master board 102 in stack of hardware boards 100. Processor(s) 104 of master board 102 can receive the data and commands and send signals to an interconnecting module 110 on master board 102 instructing interconnecting module 110 to identify the new functionality.

In one possible implementation, interconnecting module 110 can review the data and commands in the new functionality against a preprogrammed policy to decide if the new functionality should be implemented. For example, if stack of hardware boards 100 is processing an audio signal when a video signal is received at other devices 112, interconnecting module 110 can review a set policy to determine if the audio signal should continue to be processed, or if the present functionality should be changed to process the video signal.

Once interconnecting module 110 has identified a new functionality and determined that the new functionality should be implemented, interconnecting module 110 can transmit the new functionality to reconfiguration module 118 on master board 102. Reconfiguration module 118 reconfigures the communication controller 116. Reconfiguration module 118 further reconfigures data and control buses coupling hardware boards 102 in stack of hardware boards 100 to each other, such that the new functionality is implemented. In one possible embodiment, the data and control buses may be reconfigured by reprogramming communication controller 116 on master board 102, and/or one or more communication controllers 116 on other hardware boards 102 in stack of hardware boards 100.

In one implementation, reconfiguration module 118 generates reconfiguration information once a change is identified that can be made in the data and control buses coupling hardware boards 102 in stack of hardware boards 100 to implement the new functionality. The reconfiguration information can include instructions to reconfigure data and control buses to facilitate the implementation of the new functionality. Reconfiguration module 118 can identify the change by recognizing a current configuration of stack of hardware boards 100. The current configuration may include data regarding a number of hardware boards 102 in stack of hardware boards 100 and a functionality of each hardware board 102 in stack of hardware boards 100. The functionality of each hardware board 102 may be, for example, processing temperature data, humidity data, video signals received from a video camera, etc. The current configuration can also include how hardware boards 102 in stack of hardware boards 100 are coupled to one another by the data and control buses.

The current configuration can be obtained by processor(s) 104 through one or more buses, such as the data and control buses, and one more reconfiguration buses. Once the current configuration of the hardware boards 102 in stack of hardware boards 100 is identified, reconfiguration module 118 can determine which hardware boards 102 in stack of hardware boards 100 should be coupled to one another by the data and control buses to implement the new functionality. This new configuration of the data and control buses can be used to reconfigure communication controller 116.

In one implementation, reconfiguration module 118 uses the reconfiguration information to reconfigure communication controller 116 on master hardware board 102 such that the data and control buses coupling hardware boards 102 are reconfigured to implement the new functionality. In another implementation, the reconfiguration information is sent to one or more reconfiguration modules 118 on one or more hardware boards 102 in stack of hardware boards 100, and the new functionality is implemented by the one or more reconfiguration modules 118, which reconfigure the data and control buses in stack of hardware boards 100 by reconfiguring communication controllers 116.

In another possible implementation, the data and control buses are controlled, and dynamically reconfigured, using software stored in computer readable media 108 of at least one of hardware boards 102 in stack of hardware boards 100. In yet another implementation, the data and control buses can be operated by one or more switches which may be placed on one or more hardware boards 102 in stack of hardware boards 100. Such switches can include any switches known in the art operable to function with data and control buses.

In another possible implementation, rather than, or in addition to, processor(s) 104 triggering interconnecting module 110 to identify the new functionality, processor(s) 104 may cause an activation signal including the new functionality to be sent to reconfiguration module 118. The activation signal can cause reconfiguration module 118 to issue the reconfiguration information to communication controller 116. Alternately, processors 104 may send the new functionality to reconfiguration module 118 and initiate interconnecting module 114 to send the activation signal to reconfiguration module 118 stimulating reconfiguration module 118 to issue the reconfiguration information.

In one exemplary implementation, stack of hardware boards 100 can be reconfigured by adding more hardware boards 102 depending on additional functionalities to be performed by stack of hardware boards 100. Hardware boards 102 in stack of hardware boards 100 are connected together using buses, such as data and control buses and reconfiguration buses, in such a way that the buses can be reconfigured to add or remove hardware boards 102 in stack of hardware boards 100.

For example, if it is desired to augment the functionality of stack of hardware boards 100 to include a video processing functionality, an additional hardware board 102 which can process video content received from a video capturing device can be placed in stack of hardware boards 100. The video capturing device can be wired or wirelessly coupled to additional board 102. Alternately, the video capturing device can reside on hardware board 102 in, for example, other devices 112. Similarly, the number of functionalities implementable by stack of hardware boards 100 can be reduced by removing one or more hardware boards 102 performing the undesired functionalities.

It will also be understood that a master hardware board 102 can be a single hardware board 102 in stack of hardware boards 100, or a combination of hardware boards 102 in stack of hardware boards 100, with each hardware board 102 in the combination performing one or more functions of master hardware board 102.

In another possible implementation, stack of hardware boards 100 may rely on several hardware boards 102 without a designated master board 102. For example, a new functionality can be transmitted to input/output interfaces 106 on a first hardware board 102 from an external device coupled to input/output interfaces 106. Alternately, the new functionality can be received from other devices 112 residing on the first hardware board 102. The new functionality can then be transmitted to interconnecting module 110 on first board 102, or one or more interconnecting modules 110 on one or more other hardware boards 102 in stack of hardware boards 100. Interconnecting module(s) 110 can identify the new functionality, and/or compare the new functionality against a preset policy to see if the new functionality should be implemented or ignored.

If the new functionality should be implemented, the new functionality can be transmitted to one or more reconfiguration modules 118 on hardware boards 102 in stack of hardware boards 100. Reconfiguration module(s) 118 can assess the existing functionalities of one or more hardware boards 102 of stack of hardware boards 100, as well as a configuration of data and control buses coupling the one or more hardware boards 102 in stack of hardware boards 100. Reconfiguration module(s) 118 can also generate reconfiguration information once a change is identified that can be made in the data and control buses coupling hardware boards 102 in stack of hardware boards 100 to implement the new functionality.

Reconfiguration module(s) 118 can send reconfiguration information, including instructions on how to reconfigure the data and control buses to implement the new functionality, to one or more communication controllers 116 on hardware boards 102 in stack of hardware boards 100. The new functionality can be implemented by communication controller(s) 116, which can reconfigure the data and control buses in stack of hardware boards 100 to couple one or more of hardware boards 102. This coupling can include coupling one or more hardware boards 102 in any configuration, including coupling all of hardware boards 102 together.

Figure 2:
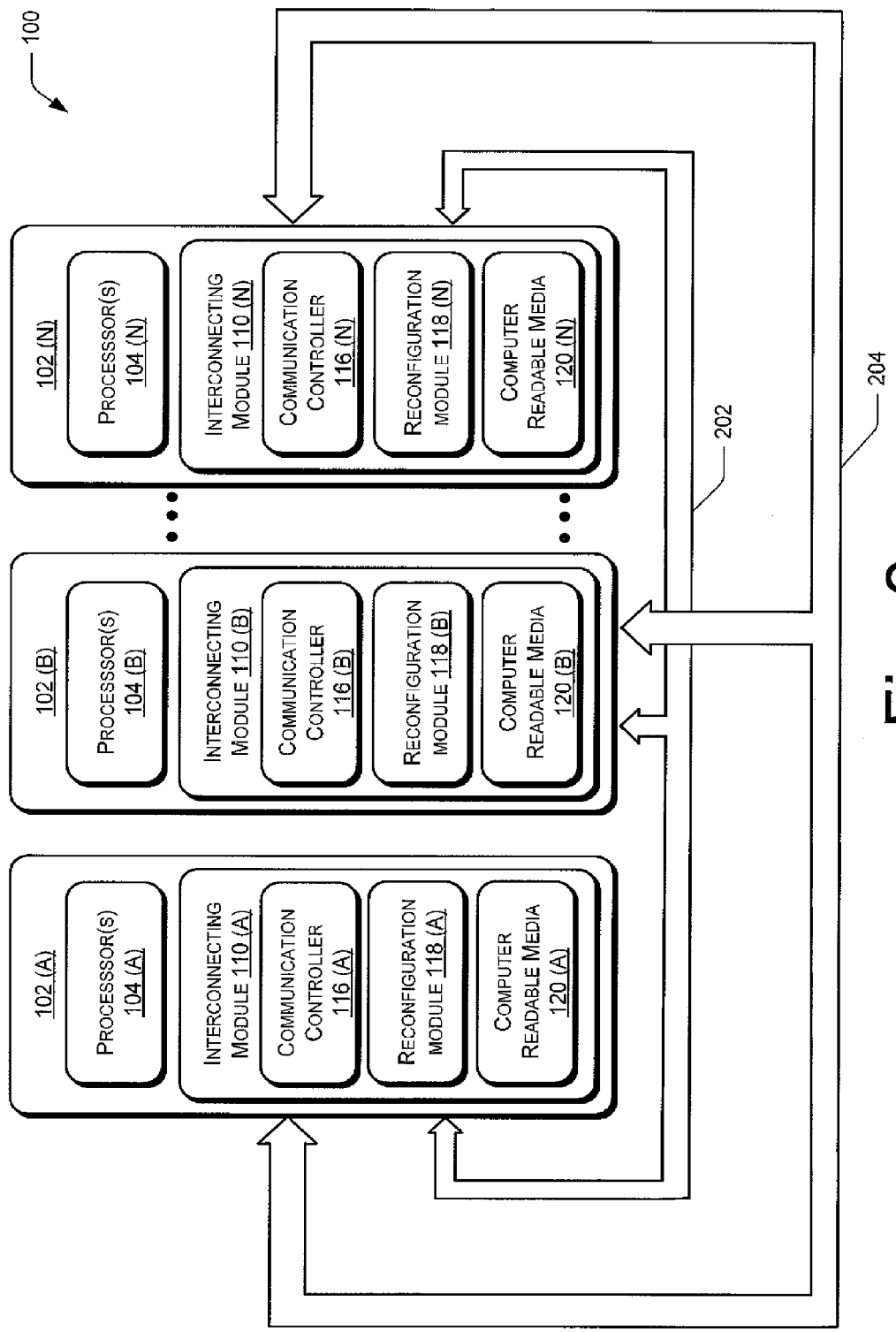
FIG. 2 illustrates an exemplary embodiment of a smart interconnect for modular multi-component embedded devices in which hardware boards are coupled by a reconfiguration bus and one or more data and control busses.

FIG. 2 shows an exemplary embodiment of a smart interconnect for modular multi-component embedded devices in which a plurality of hardware boards 102 (A-N) are coupled to each other by a reconfiguration bus 202 and one or more data and control buses 204 forming stack of hardware boards 100. In this way, stack of hardware boards 100 can perform as a single programmable unit. Reconfiguration bus 202 can couple one or more hardware boards 102 (A-N) in any possible configuration. Reconfiguration bus 202 may include, for example, a universal serial bus (USB), a recommended standard-232 (RS-232), a serial peripheral interface (SPI), an inter-integrated circuit bus (I2C), a system management bus (SM Bus), an intelligent platform management bus (IPMB), and a custom parallel/serial bus. Moreover, reconfiguration bus 202 may include multiple buses coupling hardware boards 102 (A-N) to each other in a variety of configurations.

Communication controllers 116 (A-N) can couple one or more processor(s) 104 (A-N), input/output interfaces 106, or other devices 112 or network interfaces 114 on hardware boards 102 through data and control buses 204. Moreover, data and control buses 204 can be reconfigured, altering which processor(s) 104 (A-N), input/output interfaces 106, or other devices 112 or network interfaces 114 are coupled to one another. For example, in FIG. 2 data and control buses 204 are illustrated as coupling all of processor(s) 104 (A-N) together. It will be understood, however, that communication controllers 116 (A-N) may be reconfigured to couple one or more of processor(s) 104 (A-N), input/output interfaces 106, or other devices 112 or network interfaces 114 in any possible configuration. For instance, data and control buses 204 can be configured to only couple processor(s) 104 (A-N). Data and control buses 204 can include, for example, a universal serial bus (USB), a serial peripheral interface (SPI), an industry standard architecture bus (ISA), and a custom serial/parallel bus(s).

In FIG. 2, each of hardware boards 102 is illustrated as having a communication controller 116(A-N), an interconnecting module 110(A-N), and a reconfiguration module 118 (A-N). It will be understood, however, that some of hardware boards 102 in stack of hardware boards 100 may omit some of these elements, as discussed above in conjunction with FIG. 1.

In one implementation, stack of hardware boards 100 can include a master board 102 (A), which can receive data and commands indicative of a new functionality for stack of hardware boards 100. The new functionality is identified by interconnecting module 110 (A) on master board 102 (A) and transmitted to reconfiguration module 118 of one or more hardware boards 102 in stack of hardware boards 100 using reconfiguration bus 202. Reconfiguration module 118 of one or more hardware boards 102 can send reconfiguration information to communication controller 116 (B) of a primary board 102 (B) of stack of hardware boards 100. In one implementation, primary board 102 (B) processes data received by master board 102 (A) from an external source to implement the new functionality of stack of hardware boards 100.

For example, primary board 102 (B) may be a humidity controller board which receives humidity readings of an enclosure from a humidity sensor board, such as master board 102 (A). Primary board 102 (B) examines the readings and if it is found that the readings have fallen beyond a preset humidity level, primary board 102 (B) operates air-conditioning equipment placed in the enclosure to maintain the preset humidity level.

Communication controller 116 reconfigures data and control buses 204 and communication controllers 116 of hardware boards 102, establishing a parallel connection between hardware boards 102. Data and control buses 204 may be configured in such a way that direct interaction between master board 102 (A) and primary board 102 (B) is established to implement the new functionality.

For example, data related to a temperature of an enclosure can be received by master board 102 (A), such as a temperature sensor board. Interconnecting module 110 (A), identifies a new functionality (i.e. the temperature of the room should be maintained up to a comfortable level) and sends the new functionality to reconfiguration module 118 (A). Reconfiguration module 118 (A) issues instructions to reprogram data and control buses 204 to communication controllers 116 of selected hardware boards 102 to develop a parallel communication between the temperature sensor board (master board 102 (A)) and a processor board (primary board 102 (B)) in stack of hardware boards 100 to control air-conditioning equipment and maintain the temperature inside the enclosure. The selected hardware boards 102 in stack of hardware boards 100 can be any configuration of hardware boards 102 (A-N).

In one exemplary implementation, communication controller 116 (A) can reconfigure data and control buses 204 to establish a direct interaction between master board 102 (A) and each hardware board 102 of stack of hardware boards 100 to implement the new functionality. Moreover, communication controllers 116 may—along with one or more data and control buses 204, interconnecting module 110 (A-N) and reconfiguration module 118 (A-N)—form a device which is a reconfiguration interconnect or a smart interconnect. The reconfiguration interconnect or smart interconnect is reconfigurable based on new functionalities to be performed by stack of hardware boards 100. Additionally, the reconfiguration interconnect or smart interconnect is reconfigurable such that hardware boards 102 can be added and removed from stack of hardware boards 100.

In one exemplary implementation, interconnecting module 110 (A) of primary board 102 (A) identifies a new functionality and transmits the new functionality to a master hardware board 102 of stack of hardware boards 100 through a reconfiguration bus 202. Master hardware board 102 sends the new functionality through a reconfiguration bus 202 to a reconfiguration module 118 of a target hardware board 102 selected from stack of hardware boards 100. Reconfiguration module 118 sends instructions to communication controller 116 of target hardware board 102 to reconfigure data and control buses 204. Data and control buses 204 are reconfigured by communication controller 116 such that communication between primary board 102 (A) and target hardware board 102 is established to implement the new functionality.

In yet another implementation, communication controllers 116 on hardware boards 102 (A-N) can be multiplexers/demultiplexers, which receive instructions from one or more reconfiguration modules 118. Such multiplexers/demultiplexers are connected to each other using one or more data and control buses 204, including serial buses. In one exemplary implementation, multiplexers/demultiplexers are wirelessly connected to each other Additionally, a serial bus can be coupled to multiplexers/demultiplexers of hardware boards 102 of stack of hardware boards 100 so that a time-shared relation such as a time shared multiple access (TDMA) relation, is maintained between hardware boards 102. For example, multiplexers/demultiplexers may be electronically controlled, software programmable, operated using switches and/or implemented using various other methods known in the art.

In another possible implementation, communication controllers 116 of hardware boards 102 of stack of hardware boards 100 can be programmable logic devices which receive instructions from one or more reconfiguration modules 118 (A-N). Programmable logic devices may include, for example, a computer programmable logic device (CPLD), a field-programmable gate array (FPGA), a programmable array logic (PAL), a generic array logic (GAL), a static random access memory (SRAM), an erasable programmable read-only memory (EPROM), and an electrically erasable programmable read-only memory (EEPROM). Programmable logic devices are connected to each other using data and control buses 204 which may include a programmable logic device bus, such as a high speed bus.

Additionally, if present, the programmable logic device bus can be coupled to programmable logic devices of each hardware board 102 of stack of hardware boards 100 so that a time-shared relation is maintained between hardware boards 102. In one implementation, stack of hardware boards 100 can be time synchronized by a single clock shared among hardware boards 102 in stack of hardware boards 100. One or more programmable logic devices upon receipt of the instructions can reconfigure themselves and the programmable logic device bus to implement the new functionality. Additionally, the programmable logic devices may be operated using software and various other methods known in the art.

Figure 3:
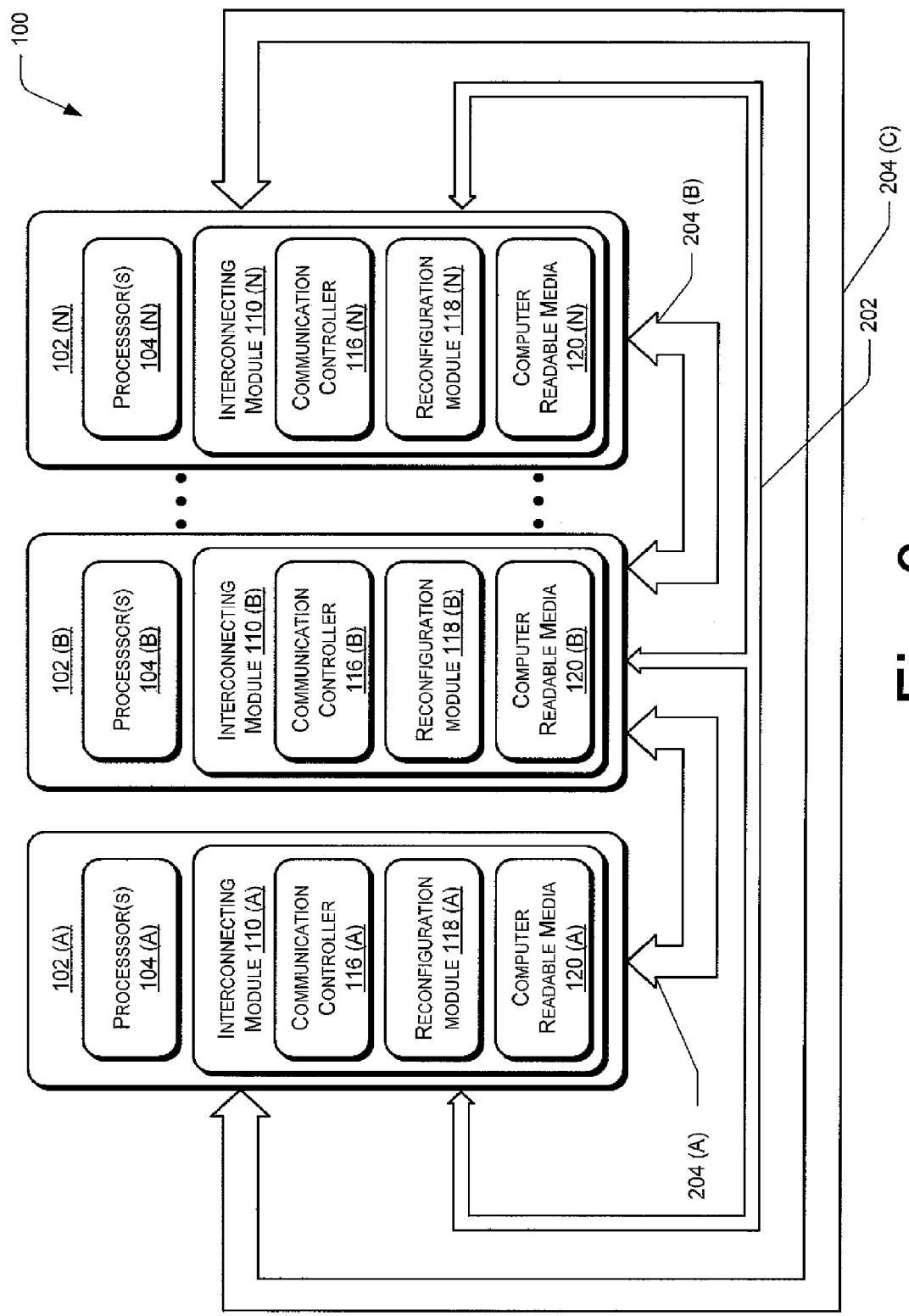
FIG. 3 illustrates another exemplary embodiment of a smart interconnect for modular multi-component embedded devices in which hardware boards are coupled by data and control buses in a daisy chain configuration.

FIG. 3 shows an exemplary embodiment of a smart interconnect for modular multi-component embedded devices in which hardware boards 102 (A-N), and various elements on hardware boards 102 (A-N), are coupled to each other by one or more data and control buses 204 in a daisy chain. For example, data and control buses 204(A) can couple hardware board 102 (A) to hardware board 102 (B). Similarly, data and control buses 204(B) can couple hardware board 102 (B) to hardware board 102 (N). Further, data and control buses 204 (C) can couple hardware board 102 (A) to hardware board 102 (N). In this way, data and control buses 204 can couple hardware boards 102 (A-N) to each other in any possible configuration.

In one implementation, stack of hardware boards 100 can include a master board 102 (A), which can receive data and commands indicative of a new functionality for stack of hardware boards 100. The new functionality is identified by interconnecting module 110 (A) and the new functionality is transmitted through reconfiguration bus 202 to various interconnecting modules 110 on affected hardware boards 102, such as interconnecting module 110 (B) on a primary board 102 (B) and interconnecting module 110 (N) on a secondary board 102 (N). Interconnecting modules 110 (B) and 110 (N) send the new functionality to reconfiguration modules 118 (B) and 118 (N) on primary board 102 (B) and secondary board 102 (N), respectively.

Reconfiguration module 118 (B) and reconfiguration module 118 (N) transmit reconfiguration information based on the new functionality to trigger communication controllers 116 (B) and 116 (N) to reconfigure data and control buses 204. Data and control buses 204 are reconfigured in such a way that master board 102 (A), primary board 102 (B) and secondary board 102 (N) communicate with each other in a daisy chain manner to implement the new functionality.

An Exemplary Method

Exemplary methods for a smart interconnect for modular multi-component embedded devices are described with reference to FIGS. 4 and 5. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked trough a communications network. In a distributed computing environment, computer executable instructions may be located in both local and remote computer storage media, including memory storage devices.

Figure 4:
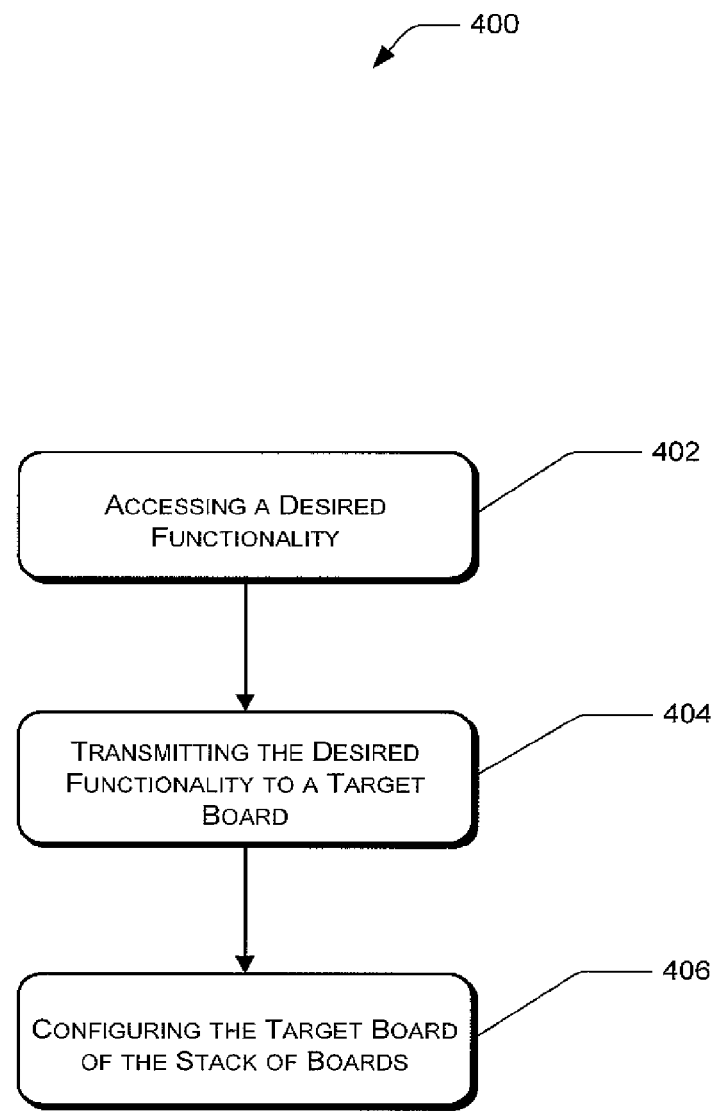
FIG. 4 illustrates exemplary method(s) for altering a functionality of a stack of hardware boards.

FIG. 4 illustrates an exemplary method 400 for altering a functionality of a stack of hardware boards 100 and is described with reference to embodiments of a smart interconnect for modular multi-component embedded devices as shown in FIGS. 1-3. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 402, a desired functionality of a stack of hardware boards, such as stack of hardware boards 100, is received. For example, one or more boards of the stack of hardware boards can receive data and/or commands indicative of a desired functionality from a variety of internal and external sources. From the data and/or commands, an interconnecting module on the one or more boards can identify the desired functionality to be implemented by the stack of hardware boards.

The internal or external sources from which the data and/or commands maybe be received can be for example, a device coupled to the stack of hardware boards 100, a device on one or more of the boards 102 in the stack of hardware boards 100, or inputs coupled to the stack of hardware boards 100 by a user of the stack of hardware boards 100. In another exemplary embodiment, the data and/or commands can be received from one or more storage media coupled to elements of any of hardware boards 102 of stack of hardware boards 100. Once received, an interconnecting module 110 on one or more hardware boards 102 can identify the desired functionality from the data and/or commands.

In one implementation, the data and/or commands indicative of the desired functionality can be received by an interconnecting module on a master board. In another possible implementation, the data and/or commands maybe received at multiple boards in the stack of hardware boards. For example, one or more hardware boards 102, including a master board 102 (A), can access a desired functionality, such as to process video information, once the one or more hardware boards 102 receive video information from a video capturing device. In another exemplary embodiment, the one or more hardware boards 102 can access the desired functionality of stack of hardware boards 100 from a database. Alternately, in yet another implementation, the desired functionality of stack of hardware boards 100 can be accessed by the one or more hardware boards 102 from a user entering the desired functionality.

Returning to the example above, in one implementation, upon receiving video media content, interconnecting module 110 can infer that the desired functionality for stack of hardware boards 100 will include a video processing or displaying capacity. Alternately, in another possible implementation, interconnecting module 110 can itself consult a set policy to determine if the video media content warrants a change from an existing functionality of stack of hardware boards 100. In another possible implementation, interconnecting module 110 can inform reconfiguration module 118 of the presence of video media content and instigate reconfiguration module 118 to consult a set policy to determine if the video media content warrants a change from the existing functionality of stack of hardware boards 100.

At block 404, the interconnecting module on the one or more boards transmits the desired functionality to a target board of the stack of hardware boards through a reconfiguration bus. For example, interconnecting module 110 on one or more hardware boards 102, including a master board 102 (A), can transmit a desired functionality, such as processing video information, to a reconfiguration module 118 on target hardware board 102 of a stack of hardware boards 100 through reconfiguration bus 202. In one implementation, the desired functionality is initially transmitted to an interconnecting module 110 on target board 102. Interconnecting module 110 transmits the desired functionality to a reconfiguration module 118 on target board 102.

In one implementation, the desired functionality can initially be transmitted to a centralized interconnecting module on a master board, which can transmit the desired functionality to a reconfiguration module on the one or more target boards. Alternately, the desired functionality can be transmitted to interconnecting module(s) on the one or more target boards. The interconnecting module(s) can transmit the desired functionality to reconfiguration module(s) on the one or more target boards.

For example, the desired functionality can be transmitted to interconnecting module 110 (B) on target board 102 (B). Interconnecting module 110 (B) can then transmit the desired functionality to reconfiguration module 118 (B) on target board 102 (B). Alternately, the desired functionality can be transmitted to interconnecting modules 110 (B-N) on several target hardware boards 102 (B-N). The interconnecting modules 110 (B-N) can transmit the desired functionality to reconfiguration modules 118 (B-N) on target hardware boards 102 (B-N).

At block 406, the reconfiguration module on the target board reviews the desired functionality and configures the target board to develop a connection with other boards in the stack of hardware boards to implement the desired functionality of the stack of hardware boards. For example, in one possible implementation, a reconfiguration module 118 examines the desired functionality, such as processing video information, then reconfigures a communication controller 116 on target board 102. Communication controller 116 reconfigures itself as well as data and control buses 204 connecting communication controllers 116 on other hardware boards 102 in the stack of hardware boards 100 to establish a direct connection between hardware boards 102 in the stack of hardware boards 100 to implement the desired functionality. For instance, assuming that in order to implement a desired functionality, target board 102 (B) should communicate directly with hardware board 102 (A), communication controller 116 (B) can reconfigure data and control buses 204 coupled to communication controller 116 (A) on board 102 (A) to establish a direct connection between hardware board 102 (A) and target board 102 (B).

Another Exemplary Method

Figure 5:
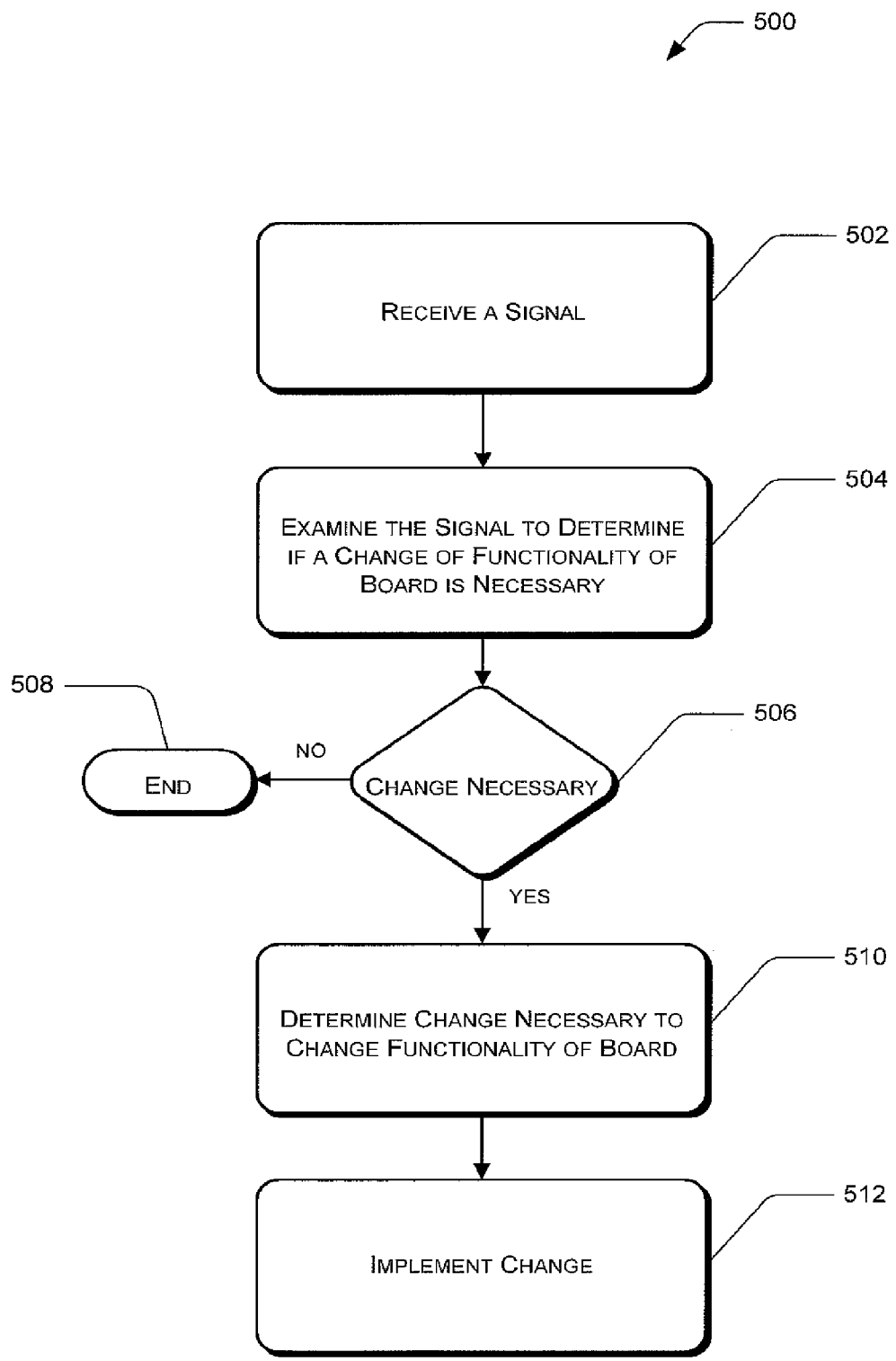
FIG. 5 illustrates exemplary method(s) for determining if a change of functionality of a stack of hardware boards is desired, and implementing any desired change.

FIG. 5 illustrates an exemplary method 500 for determining if a change of functionality of a stack of hardware boards 100 is desired, and implementing any desired change, and is described with reference to embodiments of a smart interconnect for modular multi-component embedded devices as shown in FIGS. 1-3. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 502, a signal including data related to a new functionality of a stack of hardware boards is received by a primary board of the stack of hardware boards from an external source wired or wirelessly connected to the stack of hardware boards.

For example, primary board 102 (A) of stack of hardware boards 100 can receive a signal including data related to a new functionality of stack of hardware boards 100 from a remote user. In one implementation the signal can include data from external devices coupled to hardware boards 102. The remote user may send the signal employing a computing-based device coupled to primary board 102 (A) through input/output interfaces 106. Additionally, the signal can be received at primary board 102 (A) from a variety of external devices coupled to primary board 102 (A), including a video camera, a microphone, input devices used by a user, etc.

At block 504, the signal received by the primary board may be examined, such as by an interconnecting module on the primary board, to identify the new functionality of the stack of hardware boards. Data in the new functionality can be reviewed against a set policy to determine if a change in a present functionality of the primary board is needed to implement the new functionality.

For example, primary board 102 (A) of stack of hardware boards 100 maybe processing an audio signal. Once primary board 102 (A) receives a video signal to be processed, however, interconnecting module 110 (A) on primary board 102 (A) can review a new functionality (i.e. to process the video signal) and compare this new functionality with a preset policy. This comparison can be made to determine if processing the video signal should be prioritized, and if a change in the present functionality of primary board 102 (A) should be made to implement the new functionality.

Alternately, the new functionality can be transmitted to reconfiguration module 118 (A) of primary board 102 (A), and reconfiguration module 118 (A) can check the new functionality against the preset policy to determine if processing the video signal should be prioritized or not. In one implementation, interconnecting module 110 (A) can identify an individual functionality (i.e. to receive and process video signal from a video camera) of primary board 102 (A) that should replace the present functionality of primary board 102 (A) to implement the new functionality.

At block 506, the determination is made as to whether the change in the present functionality of the primary board of the stack of hardware boards should be made to implement the new functionality. If the change in the present functionality of the primary board need not be made (i.e., "no" path from block 506), then method 500 moves to block 508 and the board continues to perform the present functionality. If the change in the present functionality of board should be made (i.e., "yes" path from block 506), then the method 500 continues to block 510.

For example, interconnecting module 110 (A) and/or reconfiguration module 118 (A) on primary board 102 (A) can determine whether the new functionality, such as processing a video signal, has a higher priority than a present functionality, such as processing an audio signal. If interconnecting module 110 (A) identifies that the new functionality has the higher priority, interconnecting module 110 (A) proceeds to identify configuration changes to be made on primary board 102 (A) and/or one or more other hardware boards 102 of the stack of hardware boards 100 to implement the new functionality. Alternately, if the new functionality does not need to be prioritized, no changes are made, and primary board 102 (A) continues to perform the present functionality.

In one implementation, interconnecting module 110 (A) identifies configuration changes to be made on primary board 102 (A), related to the individual functionality of primary board 102 (A) that may replace the present functionality of primary board 102 (A) to implement the new functionality.

At block 510, changes to be made in the functionality of the primary board and/or one or more boards of the stack of hardware boards to implement the new functionality are determined. These can include changes to various buses coupled to the boards in the stack of hardware boards.

For example, interconnecting module 110 (A) of primary board 102 (A) can review the new functionality and determine if a connection between primary board 102 (A) and a processor board 102 (N) should to be set up to implement the new functionality.

At block 512, one or more changes in the functionality of the primary board are implemented to perform the new functionality of the stack of hardware boards. In one possible implementation, the interconnecting module transmits the new functionality and/or other information to a reconfiguration module to establish a direct connection between the primary board and another board in the stack of hardware boards to implement the new functionality. The reconfiguration module may be on a master board or one or more boards in stack of hardware boards. The new functionality and/or other information can be transmitted between the interconnecting module and the reconfiguration module on a reconfiguration bus.

For example, interconnecting module 110 (A) on primary board 102 (A) can transmit the new functionality, such as processing a video signal, including data and/or instructions to reconfiguration module 118 (B) on master board 102 (B) of stack of hardware boards 100 through reconfiguration bus 202. The new functionality can include instructions to set up a connection between primary board 102 (A) and processor board 102 (N).

In one embodiment, the new functionality is initially transmitted to interconnecting module 110 (B) on master board 102 (B) from interconnecting module 110 (A) on primary board 102 (A). The new functionality can then be transmitted to reconfiguration module 118 (B) on master board 102 (B).

In yet another embodiment, interconnecting module 110 (A) transmits the new functionality along with the individual functionality of primary board 102 (A) to interconnecting module 110 (A) on master board 102 (B). Then, interconnecting module 110 (A) can transmit the new functionality and the individual functionality to reconfiguration module 118 (B) on master board 102 (B).

Reconfiguration module 118 (B) can examine the new functionality to generate reconfiguration information and transmit the reconfiguration information to communication controller 116 (N) on processor board 102 (N). Communication controller 116 (N) can reconfigure data and control buses 204 connecting primary board 102 (A) and processor board 102 (N) in such a way that a direct connection is established between primary board 102 (A) and processor board 102 (N) to implement the new functionality. In one possible implementation, reconfiguration module 118 (B) generates reconfiguration information based on the new functionality and/or the individual functionality.

In yet another possible implementation, reconfiguration module 118 (B)—in addition to transmitting the reconfiguration information to communication controller 116 (N)—transmits the reconfiguration information to communication controller 116 (B) on primary board 102 (B). In this way data and control buses 204 can be reconfigured, establishing a connection between primary board 102 (B) and processor board 102 (N).

Alternately, in another possible implementation, interconnecting module 110 (B) transmits the new functionality to reconfiguration module 118 (N) on processor board 102 (N). Reconfiguration module 118 (N) configures communication controller 116 (N) and data and control buses 204 to implement the new functionality.

CONCLUSION

Although embodiments of a smart interconnect for modular multi-component embedded devices have been described in language specific to structural features and/or methods, it is to be understood that the subject of the appended claims is not necessarily limited to the specific features or methods described. Rather, the specific features and methods are disclosed as exemplary implementations of smart interconnect for modular multi-component embedded devices.

The invention claimed is:

1. A device for altering a functionality of a plurality of hardware boards, wherein individual hardware boards of the plurality of hardware boards are coupled to a bus, the device comprising:
 a master hardware board configured to receive data and commands indicative of a new functionality of the plurality of hardware boards;
 the bus includes a data and control bus and a reconfiguration bus, the data and control bus is a programmable logic device bus configured to be reconfigured to implement the new functionality;
 an interconnecting module, of the master hardware board, configured to determine the new functionality of the plurality of hardware boards, wherein the interconnecting module includes a reconfiguration module, the reconfiguration module being configured to receive the new functionality from the interconnecting module and issue instructions, via the reconfiguration bus, to reprogram one or more hardware boards of the plurality of hardware boards such that the plurality of hardware boards implement the new functionality, wherein the instructions of the reconfiguration module reconfigure the data and control bus to implement the new functionality;
 wherein the reconfiguration module is further configured to:
 identify a change to the data and control bus to implement the new functionality;
 recognize a current configuration of the plurality of hardware boards, including a number of hardware boards of the plurality of hardware boards, a functionality of each of the plurality of hardware boards, and a coupling configuration of each of the plurality of hardware boards via the data and control bus;
 determine which hardware boards of the plurality of hardware boards are to be connected to each other by the data and control bus to implement the new functionality;
 responsive to identifying at least one change, generate the reconfiguration instructions to reconfigure the data and control bus to facilitate the implementation of the new functionality;
 reconfigure, based on the reconfiguration instructions, a communication controller on the master hardware board such that one or more hardware boards and the data and control bus are configured to implement the new functionality.

2. The device of claim 1, wherein the instructions include configuration data associated with configuring one or more programmable logic device buses coupling the one or more hardware boards such that the one or more hardware boards are configured to implement the new functionality.

3. The device of claim 1, wherein the interconnecting module is located on at least one hardware board of the plurality of hardware boards.

4. The device of claim 1, wherein the reconfiguration module is located on at least one hardware board of the plurality of hardware boards.

5. The device of claim 1, wherein the at least one communication controller is coupled to one or more programmable logic device buses, the programmable logic device buses being coupled to one or more of the plurality of hardware boards such that the boards of the plurality of hardware boards maintain a time shared relation.

6. The device of claim 5, wherein the programmable logic device buses are coupled to one or more of the plurality of hardware boards in a daisy chain configuration.

7. A stack of one or more hardware boards including the device of claim 1.

8. A method of altering a functionality of a plurality of hardware boards, wherein individual hardware boards of the plurality of hardware boards are coupled to a bus, the method comprising:
  receiving, by a master hardware board, data and commands indicative of a new functionality of the plurality of hardware boards, wherein the bus includes a data and control bus, and a reconfiguration bus, the data and control bus being a programmable logic device bus configured to be reconfigured to implement the new functionality;
  determining, by an interconnecting module of the master hardware board, the new functionality of the plurality of hardware boards, wherein the interconnecting module includes a reconfiguration module;
  receiving, by reconfiguration module, the new functionality from the interconnecting module and issuing instructions, via the reconfiguration bus, to reprogram one or more hardware boards of the plurality of hardware boards such that the plurality of hardware boards implement the new functionality, wherein the instructions of the reconfiguration module reconfigure the data and control bus to implement the new functionality;
  wherein the reconfiguration module is further configured to:
  identify a change to the data and control bus to implement the new functionality;
  recognize a current configuration of the plurality of hardware boards, including a number of hardware boards of the plurality of hardware boards, a functionality of each of the plurality of hardware boards, and a coupling configuration of each of the plurality of hardware boards via the data and control bus;
  determine which hardware boards of the plurality of hardware boards are to be connected to each other by the data and control bus to implement the new functionality;
  responsive to identifying at least one change, generate the reconfiguration instructions to reconfigure the data and control bus to facilitate the implementation of the new functionality;
  reconfigure, based on the reconfiguration instructions, a communication controller on the master hardware board such that one or more hardware boards and the data and control bus are configured to implement the new functionality.

9. The method of claim 8, further comprising:
  synchronizing data communicated between at least two of the plurality of hardware boards using a time-stamp, wherein a single clock is shared by the plurality of hardware boards.

10. One or more computer-readable storage media comprising computer executable instructions that, when executed, perform acts for altering a functionality of a plurality of hardware boards, wherein individual hardware boards of the plurality of hardware boards are coupled to a bus, the acts comprising:
  receiving, by a master hardware board, data and commands indicative of a new functionality of the plurality of hardware boards, wherein the bus includes a data and control bus, and a reconfiguration bus, the data and control bus being a programmable logic device bus configured to be reconfigured to implement the new functionality;
  determining, by an interconnecting module of the master hardware board, the new functionality of the plurality of hardware boards, wherein the interconnecting module includes a reconfiguration module;
  receiving, by reconfiguration module, the new functionality from the interconnecting module and issuing instructions, via the reconfiguration bus, to reprogram one or more hardware boards of the plurality of hardware boards such that the plurality of hardware boards implement the new functionality, wherein the instructions of the reconfiguration module reconfigure the data and control bus to implement the new functionality;
  wherein the reconfiguration module is further configured to:
  identify a change to the data and control bus to implement the new functionality;
  recognize a current configuration of the plurality of hardware boards, including a number of hardware boards of the plurality of hardware boards, a functionality of each of the plurality of hardware boards, and a coupling configuration of each of the plurality of hardware boards via the data and control bus;
  determine which hardware boards of the plurality of hardware boards are to be connected to each other by the data and control bus to implement the new functionality;
  responsive to identifying at least one change, generate the reconfiguration instructions to reconfigure the data and control bus to facilitate the implementation of the new functionality;
  reconfigure, based on the reconfiguration instructions, a communication controller on the master hardware board such that one or more hardware boards and the data and control bus are configured to implement the new functionality.

11. One or more computer-readable storage media of claim 10, further comprising computer executable instructions that, when executed, perform additional acts comprising directing the master hardware board to switch from processing a first type of signal to processing a second type of signal.

12. One or more computer-readable storage media of claim 10, further comprising computer executable instructions that, when executed, perform additional acts comprising reviewing the new functionality against a preprogrammed policy and implementing the new functionality if the new functionality is allowable according to the preprogrammed policy.

13. One or more computer-readable storage media of claim 10, further comprising computer executable instructions that, when executed, perform additional acts comprising determining if the new functionality should be implemented by comparing a priority of the new functionality against a priority of an existing functionality in accordance with a preset policy.

* * * * *